(12) United States Patent
Park

(10) Patent No.: US 11,308,199 B2
(45) Date of Patent: Apr. 19, 2022

(54) USER AUTHENTICATION METHOD USING ULTRASONIC WAVES

(71) Applicant: MUZLIVE INC., Seoul (KR)

(72) Inventor: Jong Sung Park, Seoul (KR)

(73) Assignee: MUZLIVE INC., Seoul (KR)

( * ) Notice: Subject to any disclaimer, the term of this patent is extended or adjusted under 35 U.S.C. 154(b) by 0 days.

(21) Appl. No.: 17/297,662

(22) PCT Filed: May 29, 2020

(86) PCT No.: PCT/KR2020/006958
§ 371 (c)(1),
(2) Date: May 27, 2021

(87) PCT Pub. No.: WO2020/246752
PCT Pub. Date: Dec. 10, 2020

(65) Prior Publication Data
US 2021/0357494 A1    Nov. 18, 2021

(30) Foreign Application Priority Data
Jun. 4, 2019   (KR) .......................... 10-2019-0065825

(51) Int. Cl.
*G06F 21/00*     (2013.01)
*G06F 21/45*     (2013.01)

(52) U.S. Cl.
CPC .................... *G06F 21/45* (2013.01)

(58) Field of Classification Search
CPC .......... G06F 21/45; G06F 21/31; G06F 21/32; G06F 21/34; G06F 21/35; G06F 21/42; G06F 21/43; G06F 21/44; G06F 21/30
See application file for complete search history.

(56) References Cited

U.S. PATENT DOCUMENTS

| 7,260,221 B1 | 8/2007 | Atsmon |
| 2008/0071537 A1* | 3/2008 | Tamir ...................... G10L 17/00 704/246 |

FOREIGN PATENT DOCUMENTS

| JP | 2013-003746 A | 1/2013 |
| KR | 10-0585173 B1 | 6/2006 |
| KR | 10-2011-0046092 A | 5/2011 |

(Continued)

OTHER PUBLICATIONS

International Search Report from corresponding PCT Application No. PCT/KR2020/006958, dated Sep. 11, 2020.

(Continued)

*Primary Examiner* — Edward Zee
(74) *Attorney, Agent, or Firm* — Harness, Dickey & Pierce, P.L.C.

(57) ABSTRACT

A user authentication method using ultrasonic waves is disclosed. The user authentication method using ultrasonic waves, according to an embodiment of the present invention, comprises the steps of: receiving a sound wave signal which includes analog data; sampling the sound wave signal at a preset sampling rate; generating a block by selecting a preset number of pieces of sampling data; converting sampled data included in the block into frequency components; and determining, as digital data in the block, a letter or number corresponding to the frequency component having the largest magnitude from among the frequency components.

6 Claims, 6 Drawing Sheets

(56) References Cited

FOREIGN PATENT DOCUMENTS

KR   10-2014-0147035 A   12/2014

OTHER PUBLICATIONS

Office Action from corresponding Korean Patent Application No. 10-2019-0065825, dated Sep. 7, 2020.
Notice of Allowance from corresponding Korean Patent Application No. 10-2019-0065825, dated Mar. 25, 2021.

* cited by examiner

| Frequency | Digital Data |
|-----------|--------------|
| f1 | 1 |
| f2 | 2 |
| f3 | 3 |
| : | : |
| f4 | F |

FIG. 2

| Block | B1 | B2 | B3 | B4 | B5 | B6 |
|---|---|---|---|---|---|---|
| Frequency | f2 | f4 | f4 | f4 | ... | ... |

FIG. 6

USER AUTHENTICATION METHOD USING ULTRASONIC WAVES

CROSS-REFERENCE TO RELATED APPLICATIONS

This application is a national phase application of PCT Application No. PCT/KR2020/006958, filed on May 29, 2020, which claims benefit of Korean Patent Application No. 10-2019-0065825, filed on Jun. 4, 2019. The entire disclosure of the applications identified in this paragraph are incorporated herein by references.

TECHNICAL FIELD

The present invention relates to a user authentication method using ultrasonic waves and, more particularly, to a user authentication method using ultrasonic waves in which authentication information is received using a sound wave signal with an inaudible frequency and which performs a user authentication procedure.

BACKGROUND ART

Cultural technology narrowly refers to technology necessary for the planning, development, and production of various types of cultural content such as movies, games, and animations, but broadly refers to overall technology that improves the quality of cultural life based on science and technology.

Along with the development of such cultural technology, a new type of content delivery medium that broke away from the existing method began to appear. For example, in the album market, USB-type albums or albums of types that allow connection to an AUX terminal of smartphones began to appear in order to replace traditional CD-type albums.

Such a new type of album is distributed in the form of selling a storage medium in which authentication information is stored. When a user who has purchased a storage medium in which authentication information is stored connects the storage medium to a terminal device such as a smartphone or a tablet PC and then executes a corresponding application, music content corresponding to the authentication information is downloaded from a server to the terminal device.

However, recent smartphones, tablet PCs, etc. are released with traditional interfaces such as an AUX terminal being removed therefrom. Thus, in this case, authentication information stored in a storage medium cannot be transmitted to a user terminal device using the above interfaces.

A method of transmitting authentication information to a user terminal device through a wireless communication network interface such as Wi-Fi or Bluetooth may be considered. However, in this case, a wireless communication network module should be included in a storage medium in which the authentication information is stored, and also it takes a predetermined time to establish a pairing between the user terminal device and the storage medium, which causes inconvenience to users.

Accordingly, for new types of albums, there is a need for a new type of user authentication method capable of performing an authentication procedure by transmitting authentication information stored in a storage medium to a user terminal device in a non-contact manner.

SUMMARY

Technical Problem

The present invention has been designed to solve the above-described problems, and an object of the present invention is to provide a user authentication method using ultrasonic waves capable of performing an authentication procedure by transmitting authentication information stored in a storage medium to a user terminal device in a non-contact manner for new types of albums.

Technical Solution

In order to achieve the above objects, a user authentication method using ultrasonic waves according to an embodiment of the present invention includes receiving a sound wave signal, which is analog data, sampling the sound wave signal at a preset sampling rate, generating a block by selecting a preset number of pieces of sampling data, converting the sampling data included in the block into frequency components; and confirming a letter or number corresponding to a frequency component with the largest amplitude among the frequency components as digital data in the block.

According to an embodiment of the present invention, the generating of a block by selecting a preset number of pieces of sampling data may include dividing the sound wave signal at the same time intervals and sampling a sound wave signal included in a divided time domain at the preset sampling rate such that a preset number of pieces of sampling data are included in the block.

According to an embodiment of the present invention, the converting of the sampling data included in the block into frequency components may include calculating a measurement duration, which is obtained by dividing the sampling rate by the number of pieces of data included in the block, and determining a reciprocal value of the measurement duration as a frequency interval; and detecting an amplitude of each frequency component on a frequency interval basis.

According to an embodiment of the present invention, the confirming of a letter or number corresponding to a frequency component with the largest amplitude among the frequency components as digital data in the block may include confirming the digital data in the block using a mapping table storing a correspondence relationship of a letter or number included in the authentication information, wherein a frequency corresponding to a letter or number of the mapping table is set as a reciprocal interval of the measurement duration.

According to an embodiment of the present invention, the user authentication method may further include determining a preset frequency signal repeated a preset number of times as a prerequisite signal when the signal of the preset frequency is repeated the preset number of times; and confirming digital data in a block as authentication information after the prerequisite signal.

According to an embodiment of the present invention, the prerequisite signal may be a signal for identifying when the authentication information is received and for synchronizing the transmission timing with an authentication device.

Advantageous Effects

According to the above-described user authentication method using ultrasonic waves, by converting analog data into digital data, it is possible to achieve an accurate conversion within a short time while minimizing the occurrence of errors.

BRIEF DESCRIPTION OF THE DRAWINGS

FIG. 2 is a diagram illustrating a mapping table showing a correspondence relationship between a specific frequency and a number or letter included in authentication information according to an embodiment of the present invention.

FIG. 6 is a diagram illustrating a process of converting a sound wave signal into digital data and synchronizing the authentication information transmission timing with an authentication device according to an embodiment of the present invention.

DETAILED DESCRIPTION

Figure 1:
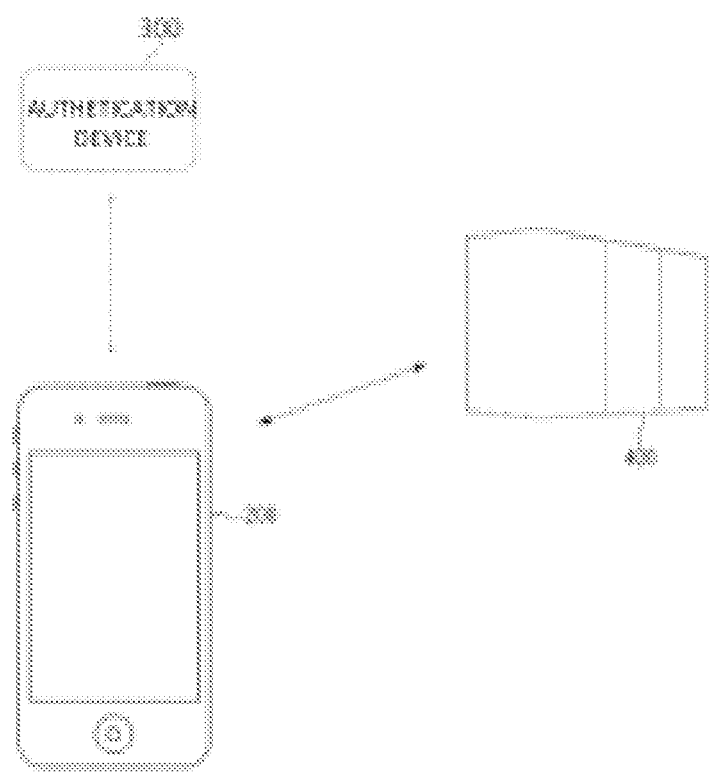
FIG. 1 is a system diagram illustrating an authentication system according to an embodiment of the present invention.

Hereinafter, preferred embodiments of the present invention will be described in detail with reference to the accompanying drawings. Advantages and features of the present invention, and implementation methods thereof will be clarified through the following embodiments described in detail with reference to the accompanying drawings. However, the present invention is not limited to the embodiments disclosed below and may be implemented in various different forms. The exemplary embodiments are provided only for completing the disclosure of the present invention and for fully indicating the scope of the present invention to those skilled in the art. The scope of the present invention is defined only by the claims. Like reference numerals refer to like elements throughout.

Unless otherwise defined, all terms (including technical and scientific terms) used herein have the same meaning as commonly understood by one of ordinary skill in the art to which this invention belongs. Also, terms defined in commonly used dictionaries should not be interpreted in an idealized or overly formal sense unless expressly so defined herein.

Also, the singular forms are intended to include the plural forms as well, unless the context clearly indicates otherwise. The terms "comprises" and/or "comprising" as used herein specify the presence of stated elements, steps, operations, and/or components but do not preclude the presence or addition of one or more other elements, steps, operations, and/or components.

FIG. 1 is a system diagram illustrating an authentication system according to an embodiment of the present invention.

An authentication system 100 according to an embodiment of the present invention includes a user terminal device 200, an authentication device 300, and a management server 400.

The user terminal device 200 may be implemented as an electronic device such as a smartphone or a tablet PC and may reproduce content received from the management server 400.

To this end, a dedicated application capable of reproducing the received content may be installed in the user terminal device 200 according to an embodiment of the present invention. Also, the dedicated application receives an analog type of authentication information transmitted in the form of an inaudible frequency from the authentication device 300, converts the authentication information into digital data, and transmits the digital data to the management server 400.

A process in which the application installed on the user terminal device 200 converts an analog type of authentication information transmitted in the form of an inaudible frequency into digital data will be described below in detail.

Authentication information required to download content from the management server 400 is stored in the authentication device 300. Also, the authentication device 300 may include a voice signal output unit (not shown) configured to change authentication data into a predetermined voice signal and output the voice signal. The voice signal output unit according to an embodiment of the present invention may be implemented as a speaker.

The management server 400 stores a plurality of content files corresponding to the authentication data. In this embodiment, the management server 400 is illustrated as an example of a single physical server. However, this is for convenience of description, and it will be appreciated that the management server 400 can be physically or logically separated into a server that performs authentication, a server that stores content files, and the like.

When the management server 400 is physically or logically separated into an authentication server and a content storage server, the management server 400 transmits, to the user terminal device 200, an acquisition path for downloading content corresponding to the authentication data received from the user terminal device 200.

Upon receiving the acquisition path, the user terminal device 200 may access the content storage server through the acquisition path and download the content corresponding to the authentication data.

A method of converting authentication information transmitted from the authentication device 300 in the form of an inaudible frequency into digital data will be described below in detail.

Figure 2:
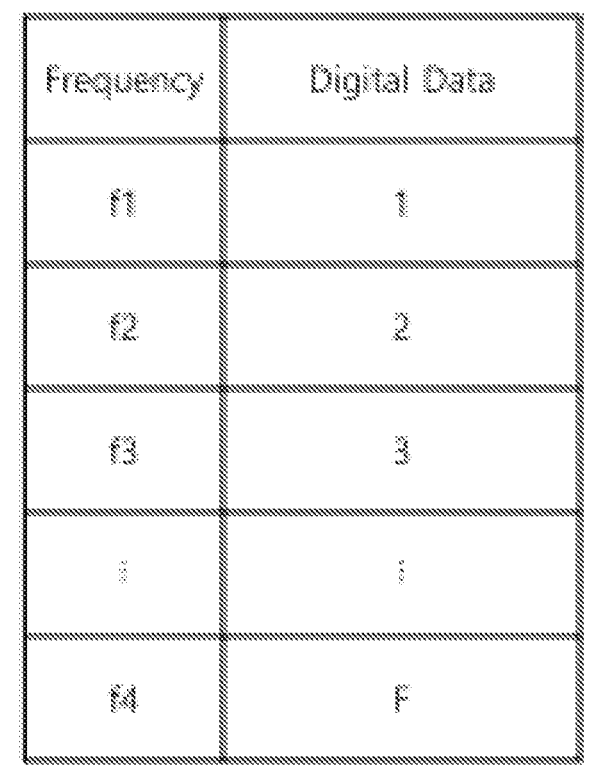

FIG. 2 is a diagram illustrating a mapping table showing a correspondence relationship between a specific frequency and a number or letter included in authentication information according to an embodiment of the present invention.

The mapping table shown in FIG. 2 may be stored in the user terminal device 200. More specifically, the mapping table may be stored in the user terminal device 200 in the form of a file constituting an application executed in the user terminal device 200.

Authentication information transmitted from the authentication device 300 to the user terminal device 200 may be a combination of letters or numbers. According to an embodiment, the authentication information may be a hexadecimal number that is a combination of letters and numbers.

According to the above-described embodiment, when the authentication information is a hexadecimal number, the mapping table includes frequency information corresponding to letters and numbers included in the hexadecimal number. Specifically, information indicating that a frequency corresponding to the number "1" is f1 and a frequency corresponding to the number "2" is f2 may be included.

Therefore, when a sound wave signal in the form of an inaudible frequency, which is analog data, is received from the authentication device 300, the user terminal device 200 may analyze a frequency component included in the sound wave signal and convert analog data transmitted from the authentication device 300 into digital data using the mapping table.

Figure 3:
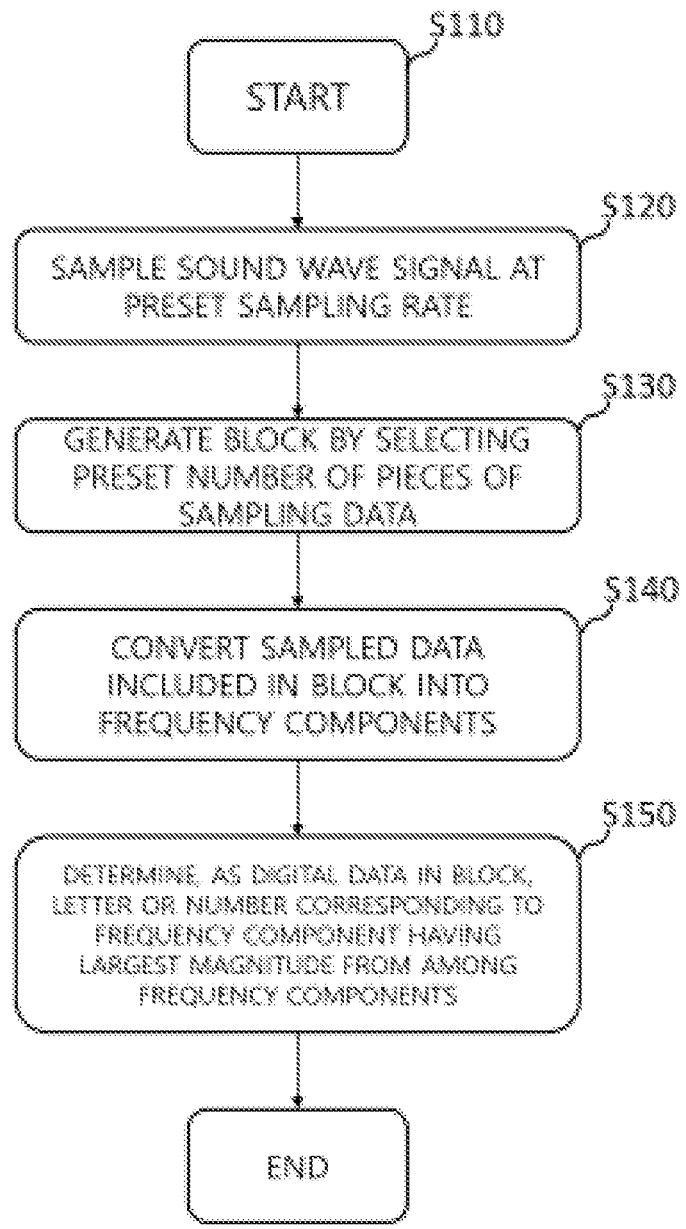
FIG. 3 is a flowchart illustrating a user authentication method using ultrasonic waves according to an embodiment of the present invention.

FIG. 3 is a flowchart illustrating a user authentication method using ultrasonic waves according to an embodiment of the present invention.

In FIG. 3, a subject performing each step is omitted for convenience of description, but those skilled in the art can recognize that each step shown in FIG. 3 may be performed by the user terminal device 200. More specifically, each step illustrated in FIG. 3 may be performed by a hardware component of the user terminal device 200 executing an application installed on the user terminal device 200.

First, the user terminal device 200 receives a sound wave signal which is analog data output from an authentication device 300 (S110). The user terminal device 200 according to an embodiment of the present invention may have a microphone (not shown) for receiving an external sound wave signal and may receive a sound wave signal output from the authentication device 300.

When a sound wave signal is received, the user terminal device 200 samples the sound wave signal at a preset sampling rate (S120). Here, the sampling of the sound wave signal means selecting data at predetermined time intervals and converting continuous analog data into discrete data.

When the sampling of the sound wave signal is completed, the user terminal device 200 selects a preset number of pieces of data to generate a block (S130). Here, a block means data divided at specific time intervals in a time domain.

As described above, since a block is generated after the sampling of a sound wave signal is completed, the sampling data is included in the block. In this case, the number of sampled pieces of data included in one block may be determined based on an initial setting value. Preferably, one block is generated such that 1,024 sampled pieces of data are included in the block.

When the generation of the block is completed, the user terminal device 200 converts the sampling data included in the block into frequency components (S140). The sampling data included in the block may be expressed as a synthetic signal of sine waves with different frequencies.

That is, the user terminal device 200 may express the amplitude of a sine wave with a frequency of f1 and the amplitude of a sine wave with a frequency of f2 among the sampled pieces of data. A process of converting sampled pieces of data included in a block into different frequency components will be described in detail with reference to FIG. 5.

After converting the sampled pieces of data included in the block into the frequency components, the user terminal device 200 may confirm a letter or number corresponding to a frequency component with the largest amplitude among the frequency components as digital data of the block (S150).

For example, when sampled pieces of data included in a first block are converted into frequency components and a frequency component of f2 has the largest amplitude, the user terminal device 200 determines that a letter or number corresponding to f2 as digital data of the block using the mapping table shown in FIG. 2.

When analog data is converted into digital data through the above-described method, it is possible to achieve an accurate conversion within a short time while minimizing the occurrence of errors.

Figure 4:
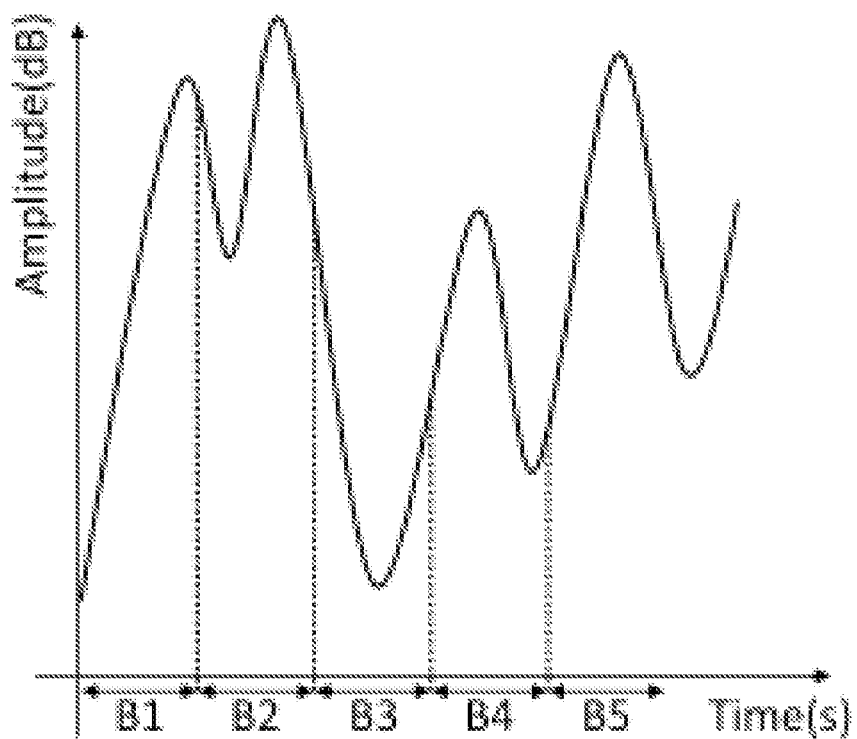
FIG. 4 is a diagram illustrating a process of generating a block and converting data included in the block into frequency components according to an embodiment of the present invention.

FIG. 4 is a diagram illustrating a process of generating a block and converting data included in the block into frequency components according to an embodiment of the present invention.

A sound wave signal output from an authentication device 300 may be displayed as a waveform as shown in FIG. 4. The user terminal device 200 samples a sound wave signal, which is analog data, and converts a signal measured at a specific time into a numerical value.

Sampling refers to converting continuous data into discrete data by cutting the continuous data at predetermined time intervals. At this time, the sampling rate may be expressed as the number of samples per second.

For example, a sampling frequency of 20 kHz means that 20,000 pieces of data are sampled per second. At this time, the sampling frequency determines the upper limit frequency of the signal to be interpreted. Specifically, the highest frequency that can be measured is ½ of the sampling frequency.

This is because when the frequency of the signal to be measured exceeds ½ of the sampling frequency, a sufficient amount of data to reproduce the continuous signal is not obtained from the sampling data.

The user terminal device 200 according to an embodiment of the present invention samples a sound wave signal at a preset sampling rate, selects a preset number of pieces of sampling data, and generates blocks B1, B2, B3, B4, and B5. For example, the user terminal device 200 according to an embodiment of the present invention may select 1,024 pieces of sampling data to generate one block. In the embodiment shown in FIG. 5, 1,024 pieces of sampling data may be included in each of the blocks B1 to B5.

When the above-described block is interpreted in a time domain, the block may be interpreted such that a sound wave signal is divided at the same time intervals, a sound wave signal included in the time domain is sampled at a preset sampling rate, and a preset number of pieces of sampling data are included in the block.

At this time, it is assumed that the sampling rate is expressed as Fs and the number of pieces of data included in one block is expressed as Bn. Then, by dividing Bn by Fs, it is possible to obtain the time required to sample the data indicated by Bn. For example, when the sampling rate is 48 kHz and Bn is 1,024, the time required to sample 1024 pieces of data is 1024/48000 Hz=21.33 ms.

When this time is expressed as a measurement duration D and the reciprocal of D is taken, a value in a frequency domain may be determined. In this case, the reciprocal of D refers to a frequency interval in the frequency domain. In the above example, 48000 Hz/1024=46.88 Hz, and thus the amplitude of the frequency component is detected at an interval of 46.88 Hz.

Meanwhile, a frequency corresponding to a letter or number included in the authentication information described with reference to FIG. 2 may be set as a reciprocal interval of the measurement duration. For example, in the above example, the number of sampled pieces of data included in the block and the sampling rate Fs may be set so that the measurement duration time can be 46.88 Hz.

A process of detecting sampled pieces of data included in one block as frequency components of a frequency interval determined through the above process will be described below.

Figure 5:
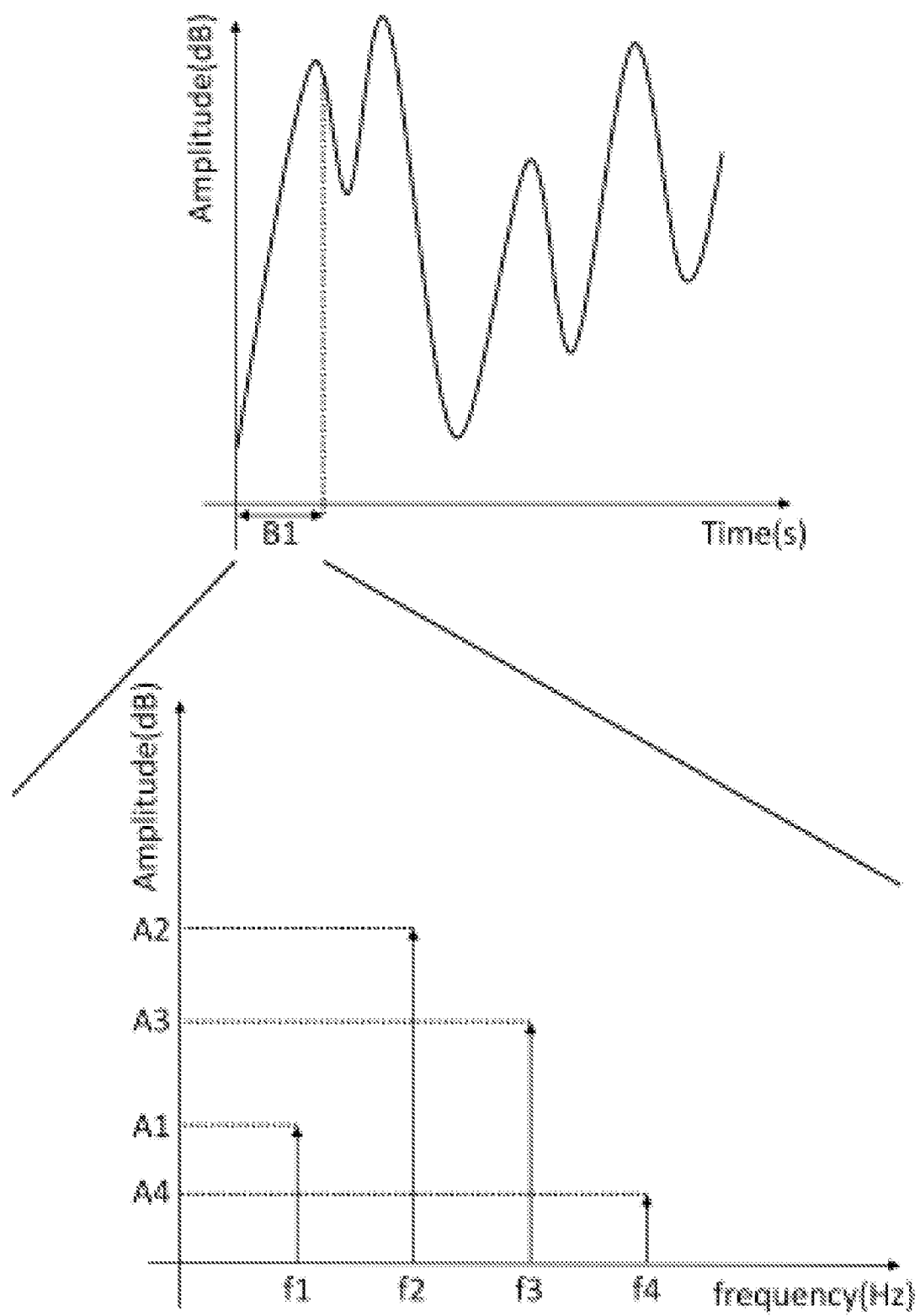
FIG. 5 is a diagram illustrating a frequency component of sampling data included in a block according to an embodiment of the present invention.

FIG. 5 is a diagram illustrating a frequency component of sampling data included in a block according to an embodiment of the present invention.

FIG. 5 shows a result of converting sampling data included in block B1 into frequency components. Specifically, when data shown in FIG. 5 is interpreted, a sound wave signal in section B1 is a signal obtained by synthesizing a signal with a frequency of f1 and an amplitude of A1, a signal with a frequency of f2 and an amplitude of A2, a signal with a frequency of f3 and an amplitude of A3, and a signal with a frequency of f4 and an amplitude of A4.

In this case, the interval between the frequency components, for example, the interval between f1 and f2, the interval between f2 and f3, and the like are the reciprocal of measurement duration D.

When frequency components of a sound wave signal included in each block are obtained through the above-described process, a frequency signal with the largest amplitude is detected. In the example shown in FIG. 5, since frequency f2 has the largest value in block B1, a letter or number corresponding to frequency f2 is confirmed as digital data in the corresponding block.

By repeating the process described with reference to FIG. 5 for all sections of analog data output from the authentication device 300, the analog data may be converted into digital data. Finally, it is possible to acquire authentication information data.

Figure 6:
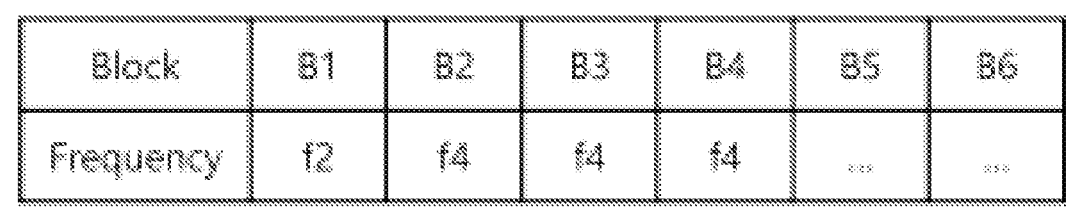

FIG. 6 is a diagram illustrating a process of converting a sound wave signal into digital data and synchronizing the authentication information transmission timing with an authentication device according to an embodiment of the present invention.

When a preset specific frequency signal is repeated a preset number of times while a frequency signal with the largest value in each block is detected through the process described in FIG. 5, digital data in subsequent blocks is confirmed as authentication information.

That is, when a signal of a preset frequency is repeated a preset number of times, a preset frequency signal repeated a preset number of times is determined as a prerequisite signal. The prerequisite signal refers to a signal for allowing the user terminal device 200 to easily identify a time point for accurately analyzing data before receiving and analyzing a sound wave signal and for synchronizing the transmission timing with the authentication device 300.

According to an embodiment of the present invention, when a case in which the frequency signal of f4 is repeated three or more times is set as the prerequisite signal, digital data corresponding to a block of a sound wave signal received after block sections B2 to B4 is recognized as authentication information in the example shown in FIG. 6.

By using the above-described prerequisite signal, it is possible to minimize errors that may occur in converting analog data into digital data and acquiring authentication.

Those skilled in the art related to the embodiments can understand that various changes in form and details may be made therein without departing from the essential characteristics of the above description. Therefore, the embodiments described herein should be considered from an illustrative aspect rather than from a restrictive aspect. The scope of the present invention should be defined not by the detailed description but by the appended claims, and all differences falling within a scope equivalent to the claims should be construed as being encompassed by the present invention.

What is claimed is:

1. A user authentication method using ultrasonic waves, the user authentication method comprising:
   receiving a sound wave signal, which is analog data;
   sampling the sound wave signal at a preset sampling rate;
   generating a block having a plurality of frequency components by selecting a preset number of pieces of sampling data;
   converting the sampling data included in the block into the plurality of frequency components and calculating an amplitude of each frequency component; and
   confirming a letter or number corresponding to a frequency component with the largest amplitude among the plurality of frequency components as digital data in the block.

2. The user authentication method of claim 1, wherein the generating of a block having a plurality of frequency components by selecting a preset number of pieces of sampling data comprises dividing the sound wave signal at the same time intervals and sampling a sound wave signal included in a divided time domain at the preset sampling rate such that a preset number of pieces of sampling data are included in the block.

3. The user authentication method of claim 1, wherein the converting of the sampling data included in the block into the plurality of frequency components comprises:
   calculating a measurement duration, which is obtained by dividing the sampling rate by the number of pieces of data included in the block, and determining a reciprocal value of the measurement duration as a frequency interval; and
   detecting an amplitude of each frequency component on a frequency interval basis.

4. The user authentication method of claim 3, wherein the confirming of a letter or number corresponding to a frequency component with the largest amplitude among the plurality of frequency components as digital data in the block comprises confirming the digital data in the block using a mapping table storing a correspondence relationship of a letter or number included in the authentication information, wherein a frequency corresponding to a letter or number of the mapping table is set as a reciprocal interval of the measurement duration.

5. The user authentication method of claim 1, further comprising:
   determining a preset frequency signal repeated a preset number of times as a prerequisite signal when the signal of the preset frequency is repeated the preset number of times; and
   confirming digital data in a block as authentication information after the prerequisite signal.

6. The user authentication method of claim 5, wherein the prerequisite signal is a signal for identifying when the authentication information is received and for synchronizing the transmission timing with an authentication device.

* * * * *